United States Patent

Besecke et al.

Patent Number: 5,247,035
Date of Patent: Sep. 21, 1993

[54] SOLUBLE POLYMERS

[75] Inventors: Siegmund Besecke, Hameln; Andreas Deckers, Ludwigshafen; Harald Lauke, Mannheim, all of Fed. Rep. of Germany

[73] Assignee: BASF Aktiengesellschaft, Ludwigshafen, Fed. Rep. of Germany

[21] Appl. No.: 5,781

[22] Filed: Jan. 19, 1993

[30] Foreign Application Priority Data

Jan. 24, 1992 [DE] Fed. Rep. of Germany ....... 4201844

[51] Int. Cl.$^5$ .................... C08F 222/30; C08F 222/20
[52] U.S. Cl. .................................. 526/244; 526/320; 526/309; 526/298; 526/304; 526/316; 526/318.1; 526/311; 526/312; 526/292.3; 526/245; 526/247; 526/248
[58] Field of Search ............... 526/320, 309, 316, 304, 526/298, 244

[56] References Cited

U.S. PATENT DOCUMENTS 4,889,948 12/1989 Mathias et al. .................... 560/181

OTHER PUBLICATIONS

L. J. Mathias et al. (1988) Polym Preprints 29CV, 329–330.
Journal of Polymer Science C. Letters Edition 25(1987) 451 Mathias, L. J. & Kusefoglu, Srl.

Primary Examiner—Joseph L. Schofer
Assistant Examiner—Mark Nagumo
Attorney, Agent, or Firm—Keil & Weinkauf

[57] ABSTRACT

At least 95% tetrahydrofuran soluble polymers are obtainable by copolymerization of a monomer mixture of A) from 1 to 99% by weight of at least one at least 98% pure monomer of the general formula I $$CH_2=C(E)CH_2-O-CH_2C(E')=CH_2 \qquad I$$

where E and E' have been selected from the group consisting of —COOR$^1$, —COR$^1$, —CONR$^2$R$^3$ and —CN and R$^1$, R$^2$ and R$^3$ are each defined as follows:

R$^1$ = H, alkyl, cycloalkyl, cycloalkylalkyl, wherein the cycloalkyl rings may be alkyl- or alkoxy-monosubstituted, -disubstituted or -trisubstituted, hydroxyalkyl, aminoalkyl, alkylaminoalkyl, dialkylaminoalkyl, aryl, arylalkyl, wherein the aryl groups may carry up to three of the following groups: halogen, alkyl, alkoxy, carboxyl, alkoxycarbonyl, aminocarbonyl, alkylaminocarbonyl, dialkylaminocarbonyl, nitrilo, nitro, amino, alkylamino, dialkylamino;

R$^2$, R$^3$ = H, alkyl, cycloalkyl, cycloalkylalkyl, wherein the cycloalkyl rings may be alkyl- or alkoxy-monosubstituted, -disubstituted or -tri-substituted, aryl, arylalkyl, wherein the aryl groups may carry up to three of the following groups: halogen, alkyl, alkoxy, carboxyl, alkoxycarbonyl, aminocarbonyl, alkylaminocarbonyl, dialkylaminocarbonyl, nitrilo, nitro, amino, alkylamino, dialkylamino; and B) from 99 to 1% by weight of at least one further radical polymerizable monomer.

5 Claims, No Drawings

SOLUBLE POLYMERS

The present invention relates to at least 95% tetrahydrofuran soluble polymers obtainable by copolymerization of a monomer mixture of A) from 1 to 99% by weight of at least one at least 98% pure monomer of the general formula I

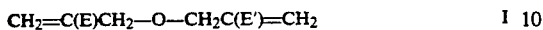
$$CH_2=C(E)CH_2-O-CH_2C(E')=CH_2 \quad I$$

where E and E' have been selected from the group consisting of $-COOR^1$, $-COR^1$, $-CONR^2R^3$ and $-CN$ and $R^1$, $R^2$ and $R^3$ are each defined as follows:

$R^1$=H, $C_1$–$C_{18}$-alkyl, $C_3$–$C_8$-cycloalkyl, $C_3$–$C_8$-cycloalkyl-$C_1$–$C_5$-alkyl, wherein the cycloalkyl rings may be $C_1$–$C_4$-alkyl- or $C_1$–$C_4$-alkoxy- monosubstituted, -disubstituted or -trisubstituted, hydroxy-$C_1$–$C_5$-alkyl, amino-$C_1$–$C_5$-alkyl, N-$C_1$–$C_4$-alkylamino-$C_1$–$C_5$-alkyl, N,N-di($C_1$–$C_4$-alkyl)amino-$C_1$–$C_5$-alkyl, $C_6$–$C_{18}$-aryl, $C_6$–$C_{18}$-aryl-$C_1$–$C_4$-alkyl, wherein the aryl groups may carry up to three of the following groups: halogen, $C_1$–$C_{22}$-alkyl, $C_1$–$C_4$-alkoxy, carboxyl, $C_1$–$C_4$-alkoxycarbonyl, aminocarbonyl, $C_1$–$C_4$-alkylaminocarbonyl, di($C_1$–$C_4$-alkyl)aminocarbonyl, nitrilo, nitro, amino, $C_1$–$C_4$-alkylamino, di($C_1$–$C_4$-alkyl)amino;

$R^2$, $R^3$=H, $C_1$–$C_{18}$-alkyl, $C_3$–$C_8$-cycloalkyl, $C_3$–$C_8$-cycloalkyl-$C_1$–$C_5$-alkyl, wherein the cycloalkyl rings may be $C_1$–$C_4$-alkyl- or $C_1$–$C_4$-alkoxy- monosubstituted, -di-substituted or -tri-substituted, $C_6$–$C_{18}$-aryl, $C_6$–$C_{18}$-aryl-$C_1$–$C_4$-alkyl, wherein the aryl groups may carry up to three of the following groups: halogen, $C_1$–$C_{22}$-alkyl, $C_1$–$C_4$-alkoxy, carboxyl, $C_1$–$C_4$-alkoxycarbonyl, aminocarbonyl, $C_1$–$C_4$-alkylaminocarbonyl, di($C_1$–$C_4$-alkyl)aminocarbonyl, nitrilo, nitro, amino, $C_1$–$C_4$-alkylamino, di($C_1$–$C_4$-alkyl)amino; and B) from 99 to 1% by weight of at least one further radical polymerizable monomer.

The invention further relates to a process for preparing soluble polymers, to their use for producing moldings, and to moldings from these polymers.

J. Appl. Polym. Sci. Polym. Letters Edition 25 (1987) 451 describes a copolymer of methyl methacrylate (MMA) and oxadimethyl methacrylate. The disadvantage is that the highly crosslinked copolymer, prepared by bulk polymerization of 3.5% by weight of oxadimethyl methaacrylate and and 96.5% by weight of methyl methacrylate, is infusible and insoluble, i.e., of no industrial utility.

It is an object of the present invention to provide soluble, thermoplastically processible copolymers obtainable by polymerization of oxadimethacrylates and copolymerizable monomers.

We have found that this object is achieved by the copolymers defined at the beginning.

We have also found a process for preparing the copolymers, their use for producing moldings, and moldings produced therefrom.

Component A) according to the invention comprises from 1 to 99% by weight of at least one oxadimethacrylate compound I. According to the invention, the monomer to be used has a purity of at least 98%, preferably at least 99%, particularly preferably at least 99.2%. Monomers which do not satisfy this purity criterion generally give highly crosslinked, insoluble and infusible products.

The substituents on the oxadimethacrylics I preferably have the following meanings:

$R^1$ hydrogen;

$C_1$–$C_{18}$-alkyl, preferably $C_1$–$C_{12}$-alkyl such as methyl, ethyl, n-propyl, isopropyl, n-butyl, sec-butyl, isobutyl, tert-butyl, n-pentyl, isopentyl, sec-pentyl, tert-pentyl, neopentyl, n-hexyl, n-heptyl, n-octyl, n-nonyl, n-decyl, n-undecyl, n-dodecyl and stearyl, particularly preferably $C_1$–$C_4$-alkyl such as methyl, ethyl, n-propyl, isopropyl, n-butyl, isobutyl, sec-butyl, tert-butyl;

$C_3$–$C_8$-cycloalkyl such as cyclopropyl, cyclopentyl, cyclohexyl, cycloheptyl, cyclooctyl, 4-methylcyclohexyl, 4-methoxycyclohexyl, 2,4,6-trimethylcyclohexyl;

$C_3$–$C_8$-cycloalkyl-$C_1$–$C_5$-alkyl such as cyclopropylmethyl, cyclopentylmethyl, cyclohexylmethyl, cyclopropylethyl, cyclopentylethyl, cyclohexylethyl, cyclopropylpropyl, cyclopentylpropyl, cyclohexylpropyl, cyclopentylbutyl, cyclohexylbutyl, cyclopentylpentyl, cyclohexylpentyl, cyclooctylpentyl;

hydroxy-$C_1$–$C_5$-alkyl such as hydroxymethyl, 2-hydroxyethyl, 2-hydroxypropyl, 3-hydroxypropyl, 4-hydroxybutyl, 5-hydroxypentyl, 2,2-dimethyl-3-hydroxypropyl;

amino-$C_1$–$C_5$-alkyl such as aminomethyl, 2-aminoethyl, 3-aminopropyl, 4-aminobutyl, 5-aminopentyl; N-$C_1$–$C_4$-alkylamino-$C_1$–$C_5$-alkyl such as N-methylaminomethyl, 2-(N-methylamino)ethyl, 3-(N-methylamino)propyl, 4-(N-methylamino)butyl, 5-(N-methylamino)pentyl, N-ethylaminomethyl, N-n-propylaminomethyl, N-n-butylaminomethyl;

N,N-di($C_1$–$C_4$-alkyl)amino-$C_1$–$C_5$-alkyl such as N,N-dimethylaminomethyl, 2-(N,N-dimethylamino)ethyl, 3-(N,N-dimethylamino)propyl, 4-(N,N-dimethylamino)butyl, 5-(N,N-dimethylamino)pentyl, N,N-diethylaminomethyl, N,N-di(n-propyl)aminomethyl, N,N-di(isopropyl)aminomethyl, N,N-di(n-butyl)aminomethyl, N-ethyl-N-methyl-aminomethyl, N-methyl-N-propyl-aminomethyl;

$C_6$–$C_{18}$-aryl such as phenyl, naphthyl, anthracenyl, phenantrenyl, azulenyl, biphenylenyl, triphenylenyl, preferably phenyl, it being possible for the aryl radicals to carry up to three of the groups mentioned under $R^4$;

$C_6$–$C_{18}$-aryl-$C_1$–$C_4$-alkyl, preferably phenyl-$C_1$–$C_4$-alkyl such as benzyl, 2-phenylethyl, 3-phenylpropyl, 4-phenylbutyl, particularly preferably benzyl, 2-phenylethyl, 3-phenylpropyl, it being possible for the aryl groups to carry up to three of the groups mentioned under $R^4$;

$R^2$, $R^3$ $C_1$–$C_{18}$-alkyl such as mentioned for $R^1$, including particularly preferably $C_1$–$C_4$-alkyl such as methyl, ethyl, n-propyl, isopropyl, n-butyl, sec-butyl, isobutyl, tert-butyl;

$C_3$–$C_8$-cycloalkyl such as cyclopropyl, cyclopentyl, cyclohexyl, cycloheptyl, cyclooctyl, 4-methylcyclohexyl, 2,4,6-trimethylcyclohexyl;

$C_6$–$C_{18}$-aryl as mentioned for $R^1$, preferably phenyl, which may carry up to three of the groups mentioned under $R^4$;

$C_6$–$C_{18}$-aryl-$C_1$–$C_4$-alkyl such as mentioned for $R^1$, preferably phenyl-$C_1$–$C_4$-alkyl, particularly preferably benzyl, 2-phenylethyl, 3-phenylpropyl, wherein the phenyl group may carry up to three of the groups mentioned under $R^4$; and $R^4$ halogen such as fluorine, chlorine, bromine and iodine, $C_1$-$C_{22}$-alkyl such as methyl, ethyl, n-propyl, isopropyl, n-butyl, sec-butyl, isobutyl, tert-butyl, n-pentyl, isopentyl, sec-pentyl, tert-pentyl, neopentyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-eicosyl, n-heneicosyl and n-docosyl, preferably $C_1$-$C_{12}$-alkyl such as methyl, ethyl, n-propyl, isopropyl, n-butyl, sec-butyl, isobutyl, tert-butyl, n-pentyl, isopentyl, sec-pentyl, tert-pentyl, neopentyl, n-hexyl, n-heptyl, n-octyl, n-nonyl, n-decyl, n-undecyl, n-dodecyl and stearyl, particularly preferably $C_1$-$C_4$-alkyl such as methyl, ethyl, n-propyl, isopropyl, n-butyl, isobutyl, sec-butyl, tert-butyl; $C_1$-$C_4$-alkoxy such as methoxy, ethoxy, n-propoxy and n-butoxy, carboxyl, $C_1$-$C_4$-alkoxycarbonyl such as methoxycarbonyl, ethoxycarbonyl, n-propoxycarbonyl and n-butoxycarbonyl, aminocarbonyl, $C_1$-$C_4$-alkylaminocarbonyl such as methylaminocarbonyl, ethylaminocarbonyl, n-propyl-aminocarbonyl and n-butylaminocarbonyl, di($C_1$-$C_4$-alkyl)aminocarbonyl such as dimethylaminocarbonyl, diethylaminocarbonyl, di(n-propyl)aminocarbonyl and di(n-butyl)aminocarbonyl, nitrilo, nitro, amino, $C_1$-$C_4$-alkylamino such as methylamino, ethylamino, n-propylamino and n-butylamino, di($C_1$-$C_4$-alkyl)amino such as dimethylamino, diethylamino, di(n-propyl)-amino and di(n-butyl)amino.

Particularly preferred oxadimethacrylics I are dimethyl 2,2′-[oxybis(methylene)]bis-2-propenoate, dicyclohexyl 2,2′-[oxybis(methylene)]bis-2-propenoate and cyclohexyl methyl 2,2′-[oxybis(methylene)]bis-2-propenoate.

Oxadimethacrylics I are obtainable if E and F≠ COOH not only from acrylics of the general formula II

$H_2C = C(E)H$  II but also from alcohols of the general formula III

$H_2C = C(E)CH_2OH$  III by reaction with formaldehyde. Their preparation is described for example in U.S. Pat. No. 4,889,948. It is more advantageous, however, especially if particularly pure compounds are to be obtained, to employ one of the following methods:

A) reaction of an acrylic of the general formula II

$H_2C = C(E)H$  II with formaldehyde or a formaldehyde donor in the presence of oxygen, at least one tertiary amine and preferably at least one polymerization inhibitor to form the alcohol of the general formula III

$H_2C = C(E)CH_2OH$  III and subsequent conversion of the alcohol III
b₁) with isolation thereof or
b₂) without isolation thereof
into the oxadimethacrylic I $CH_2 = C(E)CH_2 - O - CH_2C(E) = CH_2$ by heating in the presence of oxygen, at least one tertiary amine and preferably at least one polymerization inhibitor, or B) conversion of the alcohol III into the oxadimethacrylic I $CH_2 = C(E)CH_2 - O - CH_2C(E) = CH_2$ by heating in the presence of oxygen, at least one tertiary amine and preferably at least one polymerization inhibitor, or reaction of a mixture of two different acrylics of the general formulae II and IIa

$H_2C = C(E)H$  II

$H_2C = C(E')H$  IIa with formaldehyde or a formaldehyde donor in the presence of oxygen, at least one tertiary amine and preferably at least one polymerization inhibitor to form the alcohols of the general formulae III and IIIa

$H_2C = C(E)CH_2OH$  III

$H_2C = C(E')CH_2OH$  IIIa and subsequent further reaction with or without further isolation of the alcohols III and IIIa with either a) the reaction mixture containing these alcohols, or b) the isolated alcohols by heating in the presence of oxygen, at least one tertiary amine and preferably at least one polymerization inhibitor to form the oxadimethacrylic I $CH_2 = C(E)CH_2 - O - CH_2C(E') = CH_2$, or D) reaction of an acrylic II with formaldehyde or a formaldehyde donor in the presence of oxygen, at least one tertiary amine and at least one polymerization inhibitor to form the alcohol III and subsequent further reaction of the isolated alcohol III or of the reaction mixture containing the unisolated alcohol III with a further, different alcohol of the formula IIIa by heating in the presence of oxygen, at least one tertiary amine and preferably at least one polymerization inhibitor to form the oxadimethacrylic I $CH_2 = C(E)CH_2 - O - CH_2C(E') = CH_2$, or E) reaction of a mixture of two different alcohols II and IIa by heating in the presence of oxygen, at least one tertiary amine and at least one polymerization inhibitor to form the oxadimethacrylic I $CH_2 = C(E)CH_2 - O - CH_2C(E') = CH_2$.

The acrylics II required for these reactions are either commercially available or obtainable by methods known per se, for example by esterification, transesterification, amidation or aminolysis (see H. Rauch-Puntigam et al., Chemie, Physik und Technologie der Kunststoffe, vol. 9, Springer Verlag, Berlin, 1967), from the corresponding readily available acrylic precursors such as acrylic acid and known derivatives thereof.

The corresponding alcohols III are either known (see EP-B-184 731) or obtainable from the acrylics II by one of the abovementioned methods.

The formaldehyde can be used in gas form, and liquid form, for example as an aqueous solution such as formalin or in the form of a solution in an alcohol, or in solid form, for example as paraformaldehyde, trioxane or tetroxocane, or as a hemiacetal.

Suitable tertiary amines are open-chain aliphatic or cyclic tertiary amines such as trimethylamine, triethylamine, tri-n-propylamine, triisopropylamine, tri-n-butylamine, triisobutylamine, tri-n-pentylamine, methyl-diisopropylamine, N,N-diethylisopropylamine, N,N-dimethylethylamine, N,N-dimethylisopropylamine, tri-2-ethylhexylamine, N-methyldiethylamine, N,N-dimethyl-n-propylamine, N,N-dimethyl-n-butylamine, N,N-dimethylisobutylamine, N,N-dimethyl-(2-ethylhexyl)amine, N,N-diisopropyl-(2-ethylhexyl)amine, N,N-di-n-butyl-(2-ethyl-hexyl)amine, N-methyl-di(2-ethylhexyl)amine, N-n-butyl-(2-ethylhexyl)amine, N-isobutyl-di(2-ethylhexyl)amine, quinuclidine and 1,4-diazabicyclo-[2.2.2]octane (DABCO®), preferably quinuclidine and DABCO®, particularly preferably DABCO®.

The polymerization inhibitors used are in general the usual ones such as hydroquinone, hydroquinone monomethyl ether, p-benzoquinone, phenol, 2,6-dimethylphenol, 2,6-di-tert-butylphenol, methylene blue, diphenylamine, cupric oleate, ferric acetylacetonate, pyrocatechol, preferably hydroquinone monomethyl ether and hydroquinone monoethyl ether.

The oxygen can be passed in pure form or in the form of a mixture with nonreactive gases, preferably air, over or through the reaction mixture.

In the conversion of the acrylic II or of the mixed acrylics II and IIa into the oxadimethacrylic I via the alcohol compound III, the first stage is in general carried out with a molar ratio of acrylic II or II/IIa to formaldehyde of from 1:1 to 8:1, preferably from 1.0:1 to 2.5:1.

In this reaction the tertiary amine is preferably used in a molar ratio of formaldehyde to amine of from 1:1 to 200:1.

The polymerization initiator is in general used in amounts of from 10 to 1000 mg per kg of acrylic II or of acrylics mix II-IIa.

The amount of oxygen used ranges in general from 0.01 to 100, preferably from 0.1 to 20, l/h per kg of acrylic II or mix II and IIa. If air is used as oxygen donor, the gas rate will in general range from 0.01 to 1000, preferably from 1 to 250, l/h per kg of acrylic II or mix II and IIa.

The reaction is in general carried out at from 10 to 100° C., preferably at from 40° to 80° C., particularly preferably at from 60° to 75° C. Furthermore, the reaction is in general carried out under atmospheric pressure. However, it can also be carried out under reduced or superatmospheric pressure. The employment of super-atmospheric pressure is advisable in particular when the reaction is carried out at above 80° C.

Furthermore, the reaction is in general carried out without solvent. However, the reaction can also be carried out in the presence of a suitable solvent such as a $C_5$–$C_8$-alkane, preferably n-pentane, n-hexane, n-heptane, n-octane, isooctane, a carboxylic ester such as ethyl acetate or an aromatic solvent such as benzene, toluene and xylenes, particularly preferably n-hexane, isooctane and toluene, or mixtures thereof.

The reaction time depends chiefly on the reaction temperature, but will in general range from 1 to 6 h.

The resulting alcohol III or the mixture of alcohols III and IIIa can be isolated by a conventional workup method such as distillation or chromatography.

The second stage, starting from alcohol III or the mixture of alcohols III and IIIa, will in general be carried out with the same type and amount of amine, polymerization inhibitor and solvent as in the first stage. The oxygen rate will in general be within the range from 0.01 to 1000, preferably from 0.1 to 50, l/h per kg of alcohol compound III or mixture of alcohol compounds III and IIIa. If air is used as oxygen donor, the gas rate will in general be within the range from 0.1 to 1000, preferably from 1 to 500, l/h per kg of alcohol compound III or mixture of alcohol compounds III and IIIa.

The second stage conversion reaction (alcohol III into oxadimethacrylic I) is in general carried out at from 100° to 200° C., preferably at from 100° to 150° C., and at a pressure which in general will range from 70 to 300 kPa, but which preferably will be atmospheric pressure.

The water of reaction can in general be removed from the reaction mixture by distillation, preferably by rectification.

For this purpose it is a good idea to add an entrainer to the reaction mixture. Suitable entrainers for this purpose are for example aliphatic, cycloaliphatic and aromatic hydrocarbons such as n-hexane, n-heptane, isooctane, benzene, toluene, xylene and cyclohexane, carboxylic esters such as ethyl acetate, or the acrylics II if it has not been separated off prior to the reaction. The entrainer will in general be selected to have a boiling point within the range from 80° to 200° C.

The reaction time is dependent on the usual parameters such as temperature, pressure and quantities of the starting materials and will in general range from 4 to 12 h.

If the reactions starting from the acrylic II or the mixture of acrylics II and IIa are carried out as single stages, i.e. without isolating the alcohol III or the mixture of alcohols III and IIIa, it is advisable to separate off excess acrylic II, or excess mixture of acrylics II and IIa, for example by distillation, prior to the reaction to form the oxadimethacrylic I. However, this may also be done after the reaction to form the oxadimethacrylic I.

It is particularly preferable, if one of the methods A), C) and D) is used, for the acrylic II or IIa, which in general will be present in excess, to be distilled off before the product is isolated and purified by crystallization. It is similarly advantageous for the water of reaction formed in the course of A) to E) to be separated off, for example by distillation, prior to the crystallization.

To purify the oxadimethacrylic I it can be precipitated from solutions containing at least one hydrocarbon compound that is liquid at room temperature. This hydrocarbon compound may be present in the solutions from the start or be added later.

In general, the precipitation will be effected directly from the reaction mixtures, which, in general, may contain not only the oxadimethacrylic but further compounds such as starting materials, catalysts, stabilizers, etc.

This solubility-lowering hydrocarbon compound may be added right at the start of the preparation of the solution. However, in general it will be advantageous not to add it to the solution containing the oxadimethacrylic until the precipitation or crystallization is to be initiated.

The hydrocarbon compounds used will in general have boiling points within the range from 20° to 200° C., preferably from 35° to 130° C., such as aliphatic, cycloaliphatic or aromatic hydrocarbons or mixtures thereof. Examples are n-pentane, n-hexane, n-heptane, n-octane, n-nonane, n-decane and branched isomers thereof, cyclopentane, cyclohexane, cycloheptane, cyclooctane and also $C_1$–$C_4$-alkyl-substituted cycloaliphatics such as methylcyclopentane and methylcyclohexane, and aromatic hydrocarbons such as benzene, toluene and o-, m- and p-xylene.

The hydrocarbon compound is in general used in a weight ratio of hydrocarbon compound to oxadimethacrylic I of from 1:1 to 100:1, preferably from 1:1 to 10:1, particularly preferably from 2:1 to 4:1.

The temperature at the start of the crystallization is advantageously from 5° to 15° C. below the boiling point of the hydrocarbon compound in order that a very high concentration of oxadimethacrylic I in the hydro-carbon compound may be obtained. It is also possible to carry out the crystallization at other temperatures, for example at room temperature. But in general the range will be from 20° to 200° C., preferably from 40° to 130° C., and it may be necessary to employ pressures in excess of atmospheric pressure. In general, the pressure will be within the range from 70 to 250 kPa and is preferably atmospheric pressure.

If the hydrocarbon compound is not added until the crystallization is to be initiated, or if the hydrocarbon compound is immiscible or only partially miscible with the corresponding solvent, it can be advantageous, before the crystallization, to subject the mixture to intensive mixing by customary methods such as shaking, stirring or liquid-liquid extraction. This step can be carried out in one or more stages and continuously or batchwise. The temperature at which this step is carried out is advantageously within the abovementioned range from 20° to 200° C., preferably from 40° to 130° C.

The starting materials for the recrystallization will in general be solutions which contain the oxadimethacrylics in amounts within the range from 5 to 50, preferably from 10 to 30, % by weight. The solvents used in these solutions will in general be the abovementioned hydrocarbon compounds.

The subsequent crystallization of the oxadimethacrylic I is in general carried out at from (−80) to 30° C., preferably at from (−30) to 20° C. The crystalline product is then separated off in a conventional manner, for example by filtration or centrifuging, and dried in a conventional manner.

If, after the crystallization, two or more liquid phases are present, the phase which is not enriched with the hydrocarbon compound can be separated off and used in another workup cycle in order that the remaining quantities of the oxadimethacrylic I may also be obtained. This process can be repeated ad infinitum and be carried out continuously or batchwise.

The crystallization will in general be repeated until the desired purity has been obtained.

Oxadimethacrylics I where E and/or E' are each COOH are preferably prepared by hydrolyzing the oxadimethacrylic ester I where E and E' are each —COOR[1], or a mixture of various of these esters, in a basic solution and then acidifying the resulting salt. Then the precipitated acid can be separated off and, if desired, be recrystallized in an acid aqueous medium.

The basic solution used will in general be an aqueous solution of an alkali metal alcoholate such as sodium methoxide, potassium methoxide, sodium ethoxide, potassium ethoxide, preferably sodium ethoxide, an alkali or alkaline earth metal hydroxide such as lithium hydroxide, sodium hydroxide, potassium hydroxide, magnesium hydroxide, calcium hydroxide or barium hydroxide, preferably sodium hydroxide or potassium hydroxide, or ammonia.

The reaction medium may include additives such as solubilizers and polymerization inhibitors. Suitable solubilizers are for example alcohols, preferably $C_1$–$C_4$-alcohols such as methanol, ethanol, n-propanol, isopropanol, n-butanol and tert-butanol, particularly preferably methanol and ethanol. Preferred polymerization inhibitors are the customary water-soluble compounds such as hydroquinone, hydroquinone monoethyl ether and cupric salts.

The free acid is obtained by adding an acid, preferably a mineral acid such as sulfuric acid, hydrochloric acid, phosphoric acid or nitric acid, particularly preferably hydrochloric acid, to the reaction medium.

The molar ratio of base to ester will in general be selected within the range from 1:1 to 5:1, preferably from 2:1 to 4:1. The base will in general be used in the form of an aqueous solution in concentrations of from 0.1 to 40, preferably from 1 to 20, % by weight, based on water.

The amount of solubilizer will in general be within the range from 0 to 30, preferably from 0 to 10, % by weight and the amount of polymerization inhibitor within the range from 0 to 0.1, preferably from 0 to 0.05, % by weight, each percentage being based on the total amount of the reaction mixture.

The amount of acid precipitant used depends on the strength and concentration of the acid. In general the amount chosen will be such that the salt-containing medium, in general the reaction mixture, is adjusted to a pH within the range from 0.5 to 2.0, preferably from 0.5 to 1.5.

The choice of temperature is not critical, judging by experience to date. In general, the temperature range will extend from 10° to 100° C. under a pressure within the range from 70 to 300 kPa. It is also possible to carry out the hydrolysis in a pressure reactor at temperatures above 100° C., but in general not higher than 200° C. However, it is preferable to hydrolyse at from 15° to 50° C. under atmospheric pressure.

The precipitated oxadimethacrylic acid can be separated off by the usual methods such as filtration, decanting or centrifuging and, if desired, purified, for example by washing with cold water and then drying. From experience to date the oxadimethacrylic acid thus obtained is at least 99% pure.

Particularly pure oxadimethacrylic acid, for example with a by-product content of less than 100 ppm, is preferably obtainable by recrystallization. For this the oxadimethacrylic acid is in general dissolved in hot water at from 50° to 100° C., preferably at from 60° to 100° C., particularly preferably at from 80° to 100° C., and then crystallized out at from 5° to 30° C., preferably at from 10° to 25° C. Polymerization inhibitors such as hydroquinone monomethyl ether can be added to the solution in amounts of from 10 to 20 ppm. The solution can also be treated with adsorbents such as activated carbon, kieselguhr and zeolites, then filtered hot and thereafter cooled down to bring about crystallization.

The carboxylic acid groups of the oxadimethacrylic acid obtained can be further functionalized in a conventional manner to ester, amide and ketone groups (see Houben-Weyl, Methoden der organischen Chemie, vol. VIII/III, Thieme, Berlin, 1952, p. 503 ff and p. 647 ff).

Component B) according to the invention comprises from 1 to 99% by weight of at least one further monomer that is copolymerizable with the oxadimethacrylics I by a free radical mechanism.

Examples are:

acrylic acid and methacrylic acid, $C_1$–$C_{20}$-alkyl acrylates, preferably the $C_1$–$C_{12}$-alkyl esters, in particular the $C_1$–$C_4$-alkyl esters such as methyl acrylate, ethyl acrylate, propyl acrylate, n-butyl acrylate, tert-butyl acrylate, and also 2-ethylhexyl acrylate and lauryl acrylate, $C_1$–$C_{20}$-alkyl methacrylates, preferably the $C_1$–$C_4$-alkyl esters such as methyl methacrylate, ethyl methacrylate, propyl methacrylate, n-butyl methacrylate and tert-butyl methacrylate, in particular methyl methacrylate, $C_5$–$C_{12}$-cycloalkyl acrylates such as cyclopentyl acrylate, cyclohexyl acrylate, cycloheptyl acrylate, cyclooctyl acrylate, cyclododecyl acrylate, $C_5$–$C_{12}$-cycloalkyl methacrylates such as cyclopentyl methacrylate, cyclohexyl methacrylate, cycloheptyl methacrylate, cyclooctyl methacrylate, cyclododecyl methacrylate, acrylonitrile and methacrylonitrile, acrylamide and methacrylamide and their N-alkyl and N,N-dialkyl derivatives with $C_1$–$C_2$ alkyl groups, vinyl and vinylidene esters of aliphatic $C_2$–$C_8$-carboxylic acids such as vinyl acetate, aromatic vinyl monomers such as styrene and alpha-methylstyrene and their ring-monosubstituted or -polysubstituted derivatives, for example 2-, 3-, 4-methylstyrene, 2-, 3-, 4-ethylstyrene, 2-, 3-, 4-isopropylstyrene, 4-tert-butylstyrene, 3,4-dimethylstyrene, 2-, 4-chlorostyrene, 2-, 4-bromostyrene, 3,4-dichlorostyrene, vinyltoluene, particularly preferably styrene, maleic acid, fumaric acid and itaconic acid, $C_1$–$C_{10}$-alkyl maleates, fumarates and itaconates, maleamide, fumaramide and itaconamide and their N-alkyl and N,N-dialkyl derivatives with $C_1$–$C_{10}$-alkyl groups, and also mixtures thereof.

Suitable transfer regulators are monofunctional $C_1$–$C_{12}$-alkyl mercaptans such as methyl mercaptan, sec-butyl mercaptan, n-, i- and tert-dodecyl mercaptan and also thioacetic acid and its $C_1$–$C_4$-alkyl esters. They are preferably used in amounts of from 0.01 to 5% by weight, particularly preferably from 0.05 to 2% by weight. To improve the heat resistance it is preferable to employ amounts ranging from 0.1 to 1% by weight.

Transfer regulators, which are employed to limit the chain length, have also been found to improve the thermal stability.

A preferred embodiment concerns monomer mixtures of

A) from 5 to 99, preferably from 10 to 50, % by weight of an oxadimethacrylate I, preferably dimethyl 2,2'-[oxybis(methylene)]bis-2-propenoate, dicyclohexyl 2,2'-[oxybis(methylene)]bis-2-propenoate or cyclohexyl methyl 2,2'-[oxybis(methylene)]bis-2-propenoate, particularly preferably dimethyl 2,2'-[oxybis(methylene)]bis-2-propenoate or dicyclohexyl 2,2'-[oxybis(methylene)]bis-2-propenoate, and B) from 0.99 to 94.99, preferably from 49.99 to 89.99, % by weight of a monomer mixture of $B_1$) from 0 to 15, preferably from 1 to 7, % by weight of a $C_1$–$C_{20}$-alkyl acrylate, preferably a $C_1$–$C_4$-alkyl acrylate such as methyl acrylate, ethyl acrylate, propyl acrylate, n-butyl acrylate, tert-butyl acrylate, particularly preferably methyl acrylate.

An acrylate proportion higher than 15% by weight does result in higher thermal stability and flowability values, but also in general in excessively reduced heat distortion resistance values.

$B_2$) From 0 to 94, preferably from 1 to 90, % by weight of a $C_1$–$C_{20}$-alkyl methacrylate, preferably a $C_1$–$C_4$-alkyl methacrylate such as methyl methacrylate, ethyl methacrylate, propyl methacrylate, n-butyl methacrylate, tert-butyl methacrylate, particularly preferably methyl methacrylate.

$B_3$) From 0 to 20, preferably from 1 to 15, % by weight of at least one further monomer such as styrene, α-methylstyrene, vinyl chloride, acrylonitrile, methacrylonitrile, acrylamide, methacrylamide, or an acrylic or methacrylic ester.

The polymerization is carried out in the presence of from 0.01 to 5, preferably from 0.1 to 1, % by weight of n-dodecyl mercaptan.

If alkyl methacrylates are used as monomers $B_2$ this generally improves the weathering stability.

The amounts of components $B_1$) and $B_2$) will in general be chosen in such a way that the sum total is within the range from 1 to 93.99% by weight.

These preferred mixtures can be used for producing transparent molding materials that are heat distortion resistant. In general they are also weathering resistant and show high thermal stability in thermoplastic processing.

The copolymers of the invention are in general prepared in a conventional manner, for example in bulk or in solution.

In the case of bulk polymerization it is possible to use oil-soluble initiators (free radical initiators such as diacyl peroxides, peresters such as tert-butyl perpivalate, peroxidicarbonates, hydroperoxides, dialkyl peroxides such as dilauroyl peroxide or azo compounds such as azobisisobutyronitrile).

The polymerization temperature will in general be within the range from 20° to 200° C., preferably from 50° to 160° C.

The molecular weight can be controlled by means of suitable chain transfer agents such as the commercial mercaptans or by means of suitable temperature control. In general, molecular weights will be selected to be within the range from 50,000 to 180,000, preferably from 80,000 to 130,000, g/mol (weight average molecular weight).

The copolymers can also be prepared by solution polymerization. Suitable solvents are for example toluene, xylene, acetone and tetrahydrofuran. In other respects the polymerization can be carried out under the conditions described for bulk polymerization.

Details may be found for example in Houben-Weyl, Methoden der organischen Chemie, vol. 14/1.

In addition to the essential components A) and B) the copolymers and the moldings, films and fibers produced therefrom may contain customary additives and processing aids. The proportion thereof will in general be up to 5, preferably up to 2, % by weight, based on the total weight of components A) and B).

Customary additives include for example antioxidants, heat and light (UV) stabilizers, lubricants, demolders, dyes, pigments, plasticizers, antistats and flame retardants.

Antioxidants and heat stabilizers suitable for inclusion in the thermoplastic compounds of the invention are for example sterically hindered phenols, hydroquinones, phosphites and derivatives and substituted representatives of this group and mixtures thereof, preferably in concentrations up to 1% by weight, based on the weight of the mixture.

Examples of UV stabilizers are substituted resorcinols, salicylates, benzotriazoles and benzophenones, which in general can be used in amounts of up to 1% by weight.

Lubricants and demolders, which in general can be added to the thermoplastic compound in amounts of up to 1% by weight, are for example stearic acid, stearyl alcohol, alkyl stearates, N-alkylstearamides and also esters of pentaerythritol with long-chain fatty acids. Suitable dyes are organic dyes, for example anthraquinone red, organic pigments and lakes such as phthalocyanine blue, inorganic pigments such as titanium dioxide and cadmium sulfide. Suitable plasticizers are for example dioctyl phthalate, dibenzyl phthalate and butyl benzyl phthalate.

The flame retardant used can be for example a phosphorus-containing compound in amounts of from 1 to 40% by weight.

Flame retardants of this type are for example organic phosphorus compounds such as the esters of phosphoric acid, phosphorous acid, phosphonic acid and phosphinic acid and also tertiary phosphines and phosphine oxides. An example is triphenylphosphine oxide.

Suitable flame retardants also include compounds with phosphorus-nitrogen bonds, such as phosphonitrilic chloride, phosphoric ester amides, phosphoramides, phosphinamides, tris(aziridinyl)phosphine oxide or tetrakis(hydroxymethl)phosphonium chloride.

The additives can be added at any stage of the process, but stabilizers are advantageously added early in order to have protection right from the start. Accordingly, the stabilizers will in general be added even during the polymerization, provided that they do not interfere with it.

The copolymers of the invention can be processed by customary methods, for example by injection molding, extrusion molding or sintering to produce moldings, films or fibers.

The copolymers, moldings, films and fibers produced by the process of the invention have the advantage over known oxadimethacrylic copolymers of being soluble and thermoplastically processible.

The copolymers of the invention can be processed into thermoplastically processible molding materials that are heat distortion resistant.

A further preferred embodiment concerns monomer mixtures of

A) from 1 to 99% by weight, preferably from 1 to 40% by weight, of monomer I,
B) from 99 to 1% by weight, preferably from 99 to 60% by weight, of $C_1$–$C_{20}$-alkyl methacrylate,
C) from 0 to 20% by weight, preferably from 1 to 10% by weight, of $C_1$–$C_{20}$-alkyl acrylate, and
D) from 0 to 20% by weight, preferably from 1 to 10% by weight, of other monomers.

Preferred monomers I are those in which the groups E and E' are each —COOR$^1$ where R$^1$ has the aforementioned meaning, in particular where R$^1$ is particularly preferably methyl or cyclohexyl.

Particularly preferred monomers I contain less than 1,000 ppm, preferably less than 500 ppm, particularly preferably less than 100 ppm, of impurities, for example in the form of oligomers.

Suitable $C_1$–$C_{20}$-alkyl methacrylates are the aforementioned compounds recited by way of example, in particular methyl methacrylate.

Suitable $C_1$–$C_{20}$-alkyl acrylates are the aforementioned compounds recited by way of example, in particular methyl, ethyl, n-propyl, isopropyl, isobutyl, n-butyl, sec-butyl, tert-butyl, pentyl, hexyl, heptyl, 2-ethylhexyl or octyl acrylate, particularly preferably methyl, ethyl or n-butyl acrylate.

In general, additions of alkyl acrylates bring about an improvement in the flame polishability and in sawability and also an increase in the thermal stability.

Other monomers are preferably in particular those compounds which, after the polymerization, do not reduce the glass transition temperature to any significant extent, if at all. Examples are the aforementioned aromatic vinyl monomers, in particular styrene and alphamethylstyrene, and also maleic anhydride and maleamide and its N-alkyl and N,N-dialkyl derivatives.

To increase the stress cracking resistance, the monomer mixture may include from 0 to 5, preferably from 0 to 1, % by weight of multifunctional compounds with methacryloyl or acryloyl groups as crosslinkers. Examples are: allyl methacrylate, allyl acrylate, 1,4-butanediol dimethacrylate, 1,4-butanediol acrylate, ethylene glycol dimethacrylates ethylene glycol diacrylate, 1,3-butanediol dimethacrylate, 1,3-butanediol diacrylate, 1,6-hexanediol dimethacrylate, 1,6-hexanediol diacrylate, polyethylene glycol dimethacrylate, polyethylene glycol diacrylate, tetraethylene glycol dimethacrylate, tetraethylene glycol diacrylate, trimethylolpropane trimethacrylate, trimethylolpropane triacrylate, 2,2-dimethyl-1,3-propanediol dimethacrylate and divinylbenzene.

Furthermore, in particular if cast glass plates are to be manufactured, from 0 to 5, preferably from 0.1 to 4, particularly preferably from 0.5 to 3, % by weight can be added of a demolding aid. Examples of the molding aids are: stearic acid, cellulose derivatives, lecithin, diglycerides of stearic, palmitic and oleic acid, long-chain fatty alcohols such as cetyl alcohols, stearyl alcohol and also long-chain phosphoric esters.

The polymerization is in general carried out as described above or by the general chamber polymerization methods described in the literature (see Kunststoff-Handbuch, volume IX, Polymethacrylate, Carl-Hanser-Verlag, 1975, pages 15-21).

Depending on the use, the monomer mixture may be stabilized with from 0.01 to 1% by weight of customary UV stabilizers such as benzotriazoles, benzophenones, cyanoacrylates or oxamides and in particular hindered amine light stabilizers (HALS) such as the succinic or glutaric esters of 2,2,6,6-tetramethylpiperidin-4-ol mentioned in EP-A-243,319.

It may furthermore contain, in an amount of p to 40% by weight, customary additives such as flame retardants, antistats or fillers.

The polymers prepared in this way are useful in particular for manufacturing cast glass plates of enhanced heat distortion resistance, the target molecular weight average ($M_w$) being in general greater than $10^6$ g/mol and the residual monomer content less than 2% by weight. Cast glass plates thus manufactured have from observations to date a lower breakage rate than conventional cast glass plates, since they are easier to demold.

EXAMPLES

A) Examples without transfer regulator

Example 1

6 g of dimethyl 2,2'-[oxybis(methylene)]bis-2-propenoate (99.5% pure), 14 g of methyl methacrylate, 0.02 g of dilauroyl peroxide, 0.04 g of tert-butyl perpivalate and 80 g of tetrahydrofuran were heated at 65° C. for 24 h. After cooling, 1000 ml of methanol were added, and the resulting copolymer precipitate was filtered off and dried at 50° C. under a pressure of 10 kPa leaving 18.6 g (93%) of a completely tetrahydrofuran and chloroform soluble copolymer having a viscosity number of 80 (measured on a 0.5% by weight solution in chloroform).

Example 2

Example 1 was repeated with a 99.2% pure oxadimethacrylate, affording 18.4 g (92%) of a completely tetrahydrofuran and chloroform soluble copolymer having a viscosity number of 83 (measured on a 0.5% by weight solution in chloroform). The glass transition temperature $T_g$ was 127° C.

Example 3

Example 2 was repeated with 14.0 g of styrene instead of the methyl acrylate. This produced 14.4 g (72%) of a completely tetrahydrofuran and chloroform soluble copolymer having a viscosity number of 53 (measured on a 0.5% by weight solution in chloroform) and a glass transition temperature $T_g$ of 149° C.

Example 4

Example 3 was repeated using instead of the dimethyl 2,2'-[oxybis(methylene)]bis-2-propenoate, 6.0 g of the dicyclohexyl ester (purity 99.5%). This produced 15.3 g (77%) of a completely tetrahydrofuran and chloroform soluble copolymer having a viscosity number of 57 (measured on a 0.5% by weight solution in chloroform) and a glass transition temperature $T_g$ of 124° C.

Comparative Example 1

Example 1 was repeated with a 95.0% pure oxadimethacrylate, affording 19.0 g (95%) of a tetrahydrofuran and chloroform insoluble copolymer.

B) Examples with transfer regulator

Example 5

6 g of dimethyl 2,2'-[oxybis(methylene)]bis-2-propenoate (purity 99.2%), 0.3 g of methyl acrylate, 13.7 g of methyl methacrylate, 0.02 g of dilauroyl peroxide, 0.04 g of tert-butyl perpivalate, 0.04 g of n-dodecyl mercaptan and 80 g of tetrahydrofuran were heated at 65° C. for 24 h. After cooling, 1000 ml of methanol were added, and the resulting copolymer precipitate was filtered off and dried at 50° C. under a pressure of 10 kPa, leaving 16.3 g (81%) of a completely tetrahydrofuran and chloroform soluble copolymer having a viscosity number of 57 (measured on a 0.5% by weight solution in chloroform).

Examples 6 to 11

Except in the case of Example 7 (20.6 g of monomer mixture) in each case 20 g of a monomer mixture (see table) were polymerized and worked up as described in Example 5.

The glass transition temperature $T_g$ was determined by the DSC method (ASTM D 3418-82).

Thermal stability was determined as follows. Samples of the substances produced in the examples were heated by means of a thermogravimetric analyzer (TGA-M3 from Mettler) to 490° C. at a heating-up rate of 20° C./min while the change in weight was recorded. A plot of the relative weight (weight of sample at a certain temperature/initial weight at room temperature) versus the temperature produced in each case a curve with three parts: (a) an upper, almost horizontal branch until parts of the sample began to decompose, (b) an adjoining descending branch for the period in which the bulk of the sample decomposed, and (c) a lower, horizontal branch which indicates that the decomposition of the polymer sample is complete.

Two straight lines were then defined as asymptotes to the branches (a) and (b). One of the straight lines is obtained by extending the uncurved portion of curve (a) and the other by forming the tangent at the point of inversion of curve portion (b). Thermal stability, then, is the characteristic temperature $T_z$ at the point of intersection of the two straight lines. The arithmetic work was done using a Mettler computer program installed on the thermogravimetric analyzer.

The results of the individual quality control tests can be seen in Table 1. They show that the copolymers of the invention are superior in thermal properties not only to the pure polymethyl methacrylates but also to the known, insoluble oxadimethacrylate copolymer.

TABLE 1

Examples with transfer regulator

| Ex. | Oxadimethacrylate $CH_2=C(COOR)CH_2-O-CH_2C(COOR')=CH_2$ R | R' | Methyl acrylate | Methyl methacrylate | n-Dodecyl mercaptan | Solubility in THF & $CHCl_3$ | $T_g$ [°C.] | $T_z$ [°C.] |
|---|---|---|---|---|---|---|---|---|
| 5 | Me | Me[1] | 6 g | 0.3 g | 13.7 g | 0.04 g | completely | 138 | 382 |
| 6 | cyclohexyl | cyclohexyl[2] | 6 g | 0.3 g | 13.7 g | 0.04 g | completely | 123 | 382 |
| 7 | Me | Me[1] | 20 g | 0.6 g | 0 | 0.08 g | completely | 162 | 335 |
| 8 | cyclohexyl | Me[2] | 6 g | 0.4 g | 13.6 g | 0.06 g | completely | 131 | 334 |
| 9 | Me | Me[1] | 6 g | 0 | 14.0 g | 0.04 g | completely | 141 | 361 |
| for comparison | | | | | | | | | |
| 10 | — | — | 0 g | 0.3 g | 19.7 g | 0.04 g | completely | 114 | 327 |

TABLE 1-continued

| | Examples with transfer regulator | | | | | | |
|---|---|---|---|---|---|---|---|
| | Oxadimethacrylate $CH_2=C(COOR)CH_2-O-CH_2C(COOR')=CH_2$ | | Methyl acrylate | Methyl methacrylate | n-Dodecyl mercaptan | Solubility in THF & $CHCl_3$ | $T_g$ [°C.] | $T_z$ [°C.] |
| Ex. | R | R' | | | | | | |
| 11 | Me | Me[3] | 6 g | 0 | 14.0 g | 0 | insoluble | — | — |

[1] Purity 99.2%
[2] Purity 99.5%
[3] Purity 95.0%

Examples 12 to 17

The starting materials specified below in Table 2 were initially mixed in a 500 ml flask and then devolatilized under reduced pressure. Then 0.002% by weight of azobisisobutyronitrile (AIBN) was added, and the mixture was heated under $N_2$ to 75° C. and left at that temperature for 70 min. Then 0.02% by weight of tert-butyl perpivalate and 0.06% by weight of tert-butyl perisononanoate were added to the mixture. The mixture thus prepared was introduced into a silicate glass plate chamber measuring 250 mm×250 mm×4 mm. The chamber was then sealed and its contents were polymerized in a water bath at the following temperatures:

1 h at 65° C., then
4 h at 55° C., and
2 h at 75° C.

The reaction mixture was then postpolymerized in a drying cabinet at 120° C. for 3 h.

TABLE 2

| No. | MMA (%) | (I)[1] (%) | (II)[2] (ppm) | BDA2[3] (%) | Isostearic acid (%) | Breakage rate[4] (%) |
|---|---|---|---|---|---|---|
| 12 | 90 | 10 | 100 | — | — | 80 |
| 13 | 90 | 10 | 100 | — | 0.5 | 0 |
| 14 | 69 | 30 | 100 | 1.0 | 0.5 | 0 |
| for comparison | | | | | | |
| 15 | 90 | 10 | 1500 | — | — | 100 |
| 16 | 90 | 10 | 1500 | — | 0.5 | 60 |
| 17 | 69 | 30 | 1500 | 1.0 | 0.5 | 60 |

[1] Oxadimethacrylate (E=E'=COOMe)
[2] Proportion of oligomer in (I)
[3] Butanediol diacrylate
[4] Proportion of acrylate glass plates breaking on demolding in 5 attempts in each case Examples 12 and 15 show that a smaller oligomer content ameliorates the breakage rate.
Examples 13 and 16 document the positive difference of isostearic acid in connection with an oligomer content of 100 ppm.
Examples 14 and 17 show that the addition of the crosslinking agent BDA2 has neither an ameliorating nor worsening effect on the breakage rate.

We claim:

1. At least 95% tetrahydrofuran soluble polymers obtained by copolymerization of a monomer mixture of
A) from 1 to 99% by weight of at least one at least 98% pure monomer of the general formula I $$CH_2=C(E)CH_2-O-CH_2C(E')=CH_2 \quad I$$

where E and E' have been selected from the group consisting of —$COOR^1$, —$COR^1$, —$CONR^2R^3$ and —CN and $R^1$, $R^2$ and $R^3$ are each defined as follows:
$R^1$=H, $C_1$-$C_{18}$-alkyl, $C_3$-$C_8$-cycloalkyl, $C_3$-$C_8$-cycloalkyl-$C_1$-$C_5$-alkyl, wherein the cycloalkyl rings may be $C_1$-$C_4$-alkyl- or $C_1$-$C_4$-alkoxy-monosubstituted, -disubstituted or -trisubstituted, hydroxy-$C_1$-$C_5$-alkyl, amino-$C_1$-$C_5$-alkyl, N-$C_1$-$C_4$-alkylamino-$C_1$-$C_5$-alkyl, N,N-di($C_1$-$C_4$-alkyl)amino-$C_1$-$C_5$-alkyl, $C_6$-$C_{18}$-aryl, $C_6$-$C_{18}$-aryl-$C_1$-$C_4$-alkyl, wherein the aryl groups may carry up to three of the following groups: halogen, $C_1$-$C_{22}$-alkyl, $C_1$-$C_4$-alkoxy, carboxyl, $C_1$-$C_4$-alkoxycarbonyl, aminocarbonyl, $C_1$-$C_4$-alkyl-aminocarbonyl, di($C_1$-$C_4$-alkyl)aminocarbonyl, nitrilo, nitro, amino, $C_1$-$C_4$-alkylamino, di($C_1$-$C_4$-alkyl)amino;
$R^2$, $R^3$=H, $C_1$-$C_{18}$-alkyl, $C_3$-$C_8$-cycloalkyl, $C_3$-$C_8$-cycloalkyl-$C_1$-$C_5$-alkyl, wherein the cycloalkyl rings may be $C_1$-$C_4$-alkyl- or $C_1$-$C_4$-alkoxy- monosubstituted, -di-substituted or -tri-substituted, $C_6$-$C_{18}$-aryl, $C_6$-$C_{18}$-aryl-$C_1$-$C_4$-alkyl, wherein the aryl groups may carry up to three of the following groups: halogen, $C_1$-$C_{22}$-alkyl, $C_1$-$C_4$-alkoxy, carboxyl, $C_1$-$C_4$-alkoxycarbonyl, aminocarbonyl, $C_1$-$C_4$-alkylaminocarbonyl, di($C_1$-$C_4$-alkyl)aminocarbonyl, nitrilo, nitro, amino, $C_1$-$C_4$-alkylamino, di($C_1$-$C_4$-alkyl)amino; and
B) from 99 to 1% by weight of at least one further radical polymerizable monomer.

2. At least 95% tetrahydrofuran soluble polymers as claimed in claim 1, wherein the further radical polymerizable monomer used is a mixture comprising
from 1 to 99% by weight of $C_1$-$C_{20}$-alkyl methacrylate,
from 0 to 20% by weight of $C_1$-$C_{20}$-alkyl acrylate, and
from 0 to 20% by weight of other monomers.

3. At least 95% tetrahydrofuran soluble polymers as claimed in claim 1, wherein the monomer mixture has had added to it
from 0 to 5% by weight of a crosslinker containing methacryloyl or acryloyl groups, and
from 0 to 5% by weight of a demolding aid.

4. At least 95% tetrahydrofuran soluble polymers as claimed in claim 1, for which the polymerization is carried out in the presence of a transfer regulator.

5. A process for preparing at least 95% tetrahydrofuran soluble polymers as claimed in claim 1, which comprises polymerizing a monomer mixture of
A) from 1 to 99% by weight of at least one at least 98% pure monomer of the general formula I, and
B) from 99 to 1% by weight of at least one further radical polymerizable monomer with or without a transfer regulator.

* * * * *